US008477469B2

(12) United States Patent
Depping et al.

(10) Patent No.: US 8,477,469 B2
(45) Date of Patent: Jul. 2, 2013

(54) OVERVOLTAGE PROTECTION ELEMENT

(75) Inventors: Christian Depping, Lemgo (DE); Michael Tegt, Lemgo (DE); Joachim Wosgien, Löhne (DE); Markus Philipp, Berkatal (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 352 days.

(21) Appl. No.: 12/849,541

(22) Filed: Aug. 3, 2010

(65) Prior Publication Data

US 2011/0032651 A1 Feb. 10, 2011

(30) Foreign Application Priority Data

Aug. 5, 2009 (DE) ........................ 10 2009 036 125

(51) Int. Cl.
*H02H 5/04* (2006.01)
*H02H 1/04* (2006.01)

(52) U.S. Cl.
USPC ............ 361/127; 361/103; 361/124; 361/126

(58) Field of Classification Search
USPC .................................. 361/127, 126, 103, 124
See application file for complete search history.

(56) References Cited

U.S. PATENT DOCUMENTS

| | | | | |
|---|---|---|---|---|
| 7,411,769 | B2 | 8/2008 | Schimanski et al. | |
| 7,684,166 | B2 * | 3/2010 | Donati et al. | 361/118 |
| 7,839,257 | B2 * | 11/2010 | Cernicka | 337/206 |
| RE42,319 | E * | 5/2011 | Martenson et al. | 361/124 |

FOREIGN PATENT DOCUMENTS

| | | | |
|---|---|---|---|
| DE | 42 41 311 | C2 | 6/1995 |
| DE | 695 03 743 | T2 | 3/1999 |
| DE | 699 04 274 | T2 | 8/2003 |
| DE | 20 2004 006 227 | U1 | 10/2004 |
| DE | 10 2007 006 617 | B3 | 9/2008 |
| DE | 10 2007 042 991 | A1 | 12/2008 |
| EP | 0 716 493 | A1 | 6/1996 |
| EP | 0 987 803 | A1 | 3/2000 |

* cited by examiner

*Primary Examiner* — Rexford Barnie
*Assistant Examiner* — Zeev V Kitov
(74) *Attorney, Agent, or Firm* — Roberts Mlotkowski Safran & Cole, P.C.; David S. Safran

(57) ABSTRACT

An overvoltage protection element having at least one overvoltage limiting component in a housing, terminal contacts for electrical connection of the overvoltage protection element to a path to be protected, an electrically conductive connecting element and with a spring system acting on the connecting element, a first terminal contact being directly connected with the first pole of the overvoltage limiting component, the connecting element being in electrically conductive contact with the second terminal contact and the second pole of the overvoltage limiting component via a thermally separating connection. With the thermal connection separated, the connecting element moves out of electrically conductive contact with the second terminal contact and the second pole of the overvoltage limiting component by the force of the spring system an insulating disconnecting element connected to the connecting element is moved between the second terminal contact and the second pole of the overvoltage limiting component.

12 Claims, 3 Drawing Sheets

OVERVOLTAGE PROTECTION ELEMENT

BACKGROUND OF THE INVENTION

1. Field of the Invention

The invention relates to an overvoltage protection element with a housing, with at least one overvoltage limiting component which is located in the housing, especially a varistor, with two terminal contacts for electrical connection of the overvoltage protection element to the current path or signal path to be protected, with an electrically conductive connecting element and with a spring system which acts on the connecting element, the first terminal contact being in electrically conductive contact directly with the first pole of the overvoltage limiting component, in the normal state of the overvoltage protection element the connecting element being in electrically conductive contact both with the second terminal contact and also with the second pole of the overvoltage limiting component via a thermally separating connection which separates when the temperature of the overvoltage limiting component exceeds a given boundary temperature, and with the thermal connection separated the connecting element being moved out of the contact position by the force of the spring system such that the connecting element no longer has electrically conductive contact with the second terminal contact and the second pole of the overvoltage limiting component.

2. Description of Related Art

German Patent DE 42 41 311 C2 discloses an overvoltage protection element which has a thermal disconnector for monitoring the state of the varistor. In this overvoltage protection element, the first terminal element is directly connected via a flexible conductor to a rigid disconnecting element whose end facing away from the flexible conductor is connected via a solder site to the terminal lug provided on the varistor. The other terminal element is permanently connected via a flexible conductor to the varistor or a terminal lug on the varistor. The disconnecting element is exposed to a force from a spring system which leads to the disconnecting element being moved linearly away from the terminal lug when the solder connection is broken so that the varistor is electrically isolated when thermal overloaded. By way of the spring system, when the solder connection is broken, a telecommunications contact is activated at the same time so that remote monitoring of the state of the overvoltage protection element is possible. The level of the maximum allowable impulse current which can be discharged by the overvoltage protection element is limited by the use of the flexible conductors to connect the varistor.

German Utility Model DE 20 2004 006 227 U1 and corresponds to U.S. Pat. No. 7,411,769 B2 discloses an overvoltage protection element in which the monitoring of the state of a varistor takes place according to the principle of a temperature switch so that when the varistor is overheated, a solder connection between the varistor and the disconnecting element is broken; this leads to electrical isolation of the varistor. Moreover, when the solder connection is broken, a plastic element is pushed by the reset force of a spring out of a first position into a second position in which the disconnecting element, which is made as an elastic metal tongue, is thermally and electrically separated from the varistor by the plastic element so that an arc which may be present between the metal tongue and the contact site of the varistor is extinguished. Since the plastic element has two colored markings located next to one another, at the same time, it acts as an optical state display so that the state of the overvoltage protection element can be read directly on site.

European Patent Application Publication EP 0 716 493 A1 discloses an overvoltage protection element with two varistors, which has two disconnecting means which can individually isolate the varistors on their live end. The disconnecting means each have an elastic disconnecting tongue, the first end of the disconnecting tongue being permanently connected to the first terminal and the second end of the disconnecting tongue, in the normal state of the overvoltage protection element, being attached to the connecting tongue on the varistor via a solder site. If undue heating of the varistor occurs, this leads to melting of the solder connection. Since the disconnecting tongue in the soldered-on state (normal state of the overvoltage protection element) is deflected out of its rest position, and is thus pretensioned, the free end of the disconnecting tongue springs away from the connecting tongue of the varistor when the solder connection softens, by which the varistor is electrically isolated. To ensure the required insulation and tracking resistance and to extinguish an arc which forms when the gap opens it is necessary that, when the disconnecting tongue is pivoted, a distance between the second end of the disconnecting tongue and the connecting tongue of the overvoltage limiting component is achieved that is as large as possible. Moreover, the cross section of the disconnecting tongue should not be too large so that it has a sufficient spring property. However, this likewise leads to limitation of the maximum allowable impulse current.

European Patent Application Publication EP 09 87 803 A1 discloses an overvoltage protection element of the initially described type. In this overvoltage protection element, one end of a rigid, spring-loaded slide, in the normal state of the overvoltage protection element, is soldered both to the first terminal element and also to a terminal lug which is connected to the varistor. Here, undue heating of the varistor also leads to heating of the solder site so that the slide is withdrawn from the connecting site between the first terminal element and the terminal lug as a result of the force of a spring acting on it; this leads to electrical isolation of the varistor. To extinguish an arc which forms when the gap opens, only a air clearance between the first terminal element and the terminal lug connected to the varistor is available so that the overvoltage protection element must have relatively large dimensions in order to be able to reliably and promptly extinguish the arc.

The known overvoltage protection elements are generally made as "protective plugs" which form an overvoltage protection device together with the bottom part of the device. For installation of such an overvoltage protection device which, for example, is designed to protect the phase-routing conductors L1, L2, L3 and the neutral conductor N, and optionally, also the ground conductor PE, there are corresponding terminals for the individual conductors on the bottom part of the known overvoltage protection devices. For simple mechanical and electrical contact-making of the bottom part of the device with the respective overvoltage protection element, in the overvoltage protection element, the terminal contacts are made as plug pins for which there are corresponding sockets which are connected to the terminals in the bottom part of the device, so that the overvoltage protection element can be easily plugged onto the bottom part of the device.

In these overvoltage protection devices, installation and mounting can be carried out very easily and in a time-saving manner due to the capacity of the overvoltage protection elements to be plugged in. In addition, these overvoltage protection devices, in part, still have a changeover contact as the signaler for remote indication of the state of at least one overvoltage protection element and an optical state display in the individual overvoltage protection elements. The state display indicates whether the overvoltage limiting component which is located in the overvoltage protection element is still serviceable or not. Here, the overvoltage limiting component is especially varistors, but depending on the application of the overvoltage protection element, gas-filled surge arresters, spark gaps or diodes can also be used.

The above described thermal disconnectors which are used in the known overvoltage protection elements and which are based on melting of a solder connection must perform several functions. In the normal state of the overvoltage protection element, i.e., in the unbroken state, a reliable and good electrical connection between the first terminal element and the overvoltage limiting component must be ensured. When a certain boundary temperature is exceeded, the gap must ensure reliable isolation of the overvoltage limiting component and continuous insulation resistance and tracking resistance. Moreover, if the overvoltage protection elements are to have dimensions that are as small as possible, so that the overvoltage protection devices do not exceed the dimensions given for the mounting rail devices, this leads to the known overvoltage protection devices being able to be used only in the lower and the middle power classes, i.e., for pulse currents≦65 kA.

SUMMARY OF THE INVENTION

A primary object of this invention is, therefore, to provide an overvoltage protection element of the initially described type in which the aforementioned disadvantages are avoided. More specifically, both a reliable and good electrical connection in the normal state and also reliable isolation of a defective overvoltage limiting component will be ensured. Moreover, an insulation and tracking resistance that is as high as possible with an overall size of the overvoltage protection element as small as possible will be achieved so that the overvoltage protection element can discharge impulse currents as high as possible.

This object is achieved in an overvoltage protection element of the initially described type in that the electrically conductive connecting element is connected to the insulating disconnecting element such that, with the thermal connection broken, the insulating disconnecting element is moved between the second terminal contact and the second pole of the overvoltage limiting component. Because the electrically conductive connecting element which, in the normal state of the overvoltage protection element, is located between the second terminal contact and the second pole of the overvoltage limiting component and is connected to them in an electrically conductive manner, is connected to an insulating disconnecting element which, with the thermal connection broken, is located between the second terminal contact and the second pole of the overvoltage limiting component, so that an arc which may form when the gap opens is reliably extinguished by the insulating disconnecting element which travels into the gap. In the case of a fault of the overvoltage protection element, after the solder connection is broken, the conductive connecting element is moved by the force of the spring system out of the intermediate space between the second terminal contact and the second pole of the overvoltage limiting component and the insulating disconnecting element is moved into the intermediate space.

Fundamentally there are different possibilities for how the electrically conductive connecting element and the insulating disconnecting element can be made and connected to one another. The insulating disconnecting element can be formed, for example, by a circuit board which is made of an insulating material and which has a region in which the surface of the circuit board is conductive on both sides, the conductive surfaces being electrically connected to one another by means of through plating. However, the disconnecting element can also be made of a conductive material which is insulated except in the region of the connecting element, for example, it has an insulating coating or an insulating covering.

According to one preferred configuration of the invention, the insulating disconnecting element is formed by a rigid insulator plate and the conductive connecting element is formed by at least one metal piece, the metal piece preferably being pressed in an opening which is made in the insulating plate. The insulating disconnecting element and the conductive connecting element are connected tightly to one another and form a joint component, by which, on the one hand, mounting of the overvoltage protection element is simplified and, on the other hand, it is ensured that the conductive connecting element and the insulating disconnecting element always move jointly.

According to another advantageous configuration of the invention, the second terminal contact is permanently connected to a rigid metallic terminal element, in the normal state of the overvoltage protection element the end of the rigid metallic terminal element facing away from the second terminal contact being connected via a thermally separating connection, i.e., via a solder connection, to one side of the conductive connecting element. The rigid metallic terminal element can be dimensioned such that it can also easily transmit impulse currents with very high amplitudes. In the normal state of the overvoltage protection element the second pole of the overvoltage limiting component or a terminal lug connected to the pole is soldered to one side of the connecting element and the rigid metallic terminal element is soldered to the other side of the connecting element so that the second terminal contact is connected in an electrically conductive manner via the metallic terminal element and the connecting element to the second pole of the overvoltage limiting component or the terminal lug of the second pole.

It was stated at the beginning that when the thermal connection has been broken, i.e., when the solder connection has been broken, the connecting element is moved out of the contact position by the force of the spring system. This can fundamentally be accomplished by the spring being located directly between the connecting element and the housing so that the connecting element is pulled or pressed out of the contact position directly by the spring when the solder connection is broken. Of course, it is also possible for the spring to act, not on the connecting element, but on the insulating disconnecting element which is permanently connected to the connecting element.

According to one preferred configuration of the invention, there is a movable tripping slide within the housing which is acted upon by the spring system such that, when the thermal connection is broken, the tripping slide is moved out of a first position into a second position by the force of the spring system. Moreover, the tripping slide is connected to the insulating disconnecting element or the connecting element such that the electrically conductive connecting element in the first position of the tripping slide and the insulating disconnecting element in the second position of the tripping slide are located between the second terminal contact and the second pole of the overvoltage limiting component and the terminal lug. The tripping slide is thus used to move the electrically conductive connecting element out of the intermediate space between the second terminal contact and the rigid metallic terminal element connected to the second terminal contact and the second pole or the terminal lug connected to the second pole. Since the conductive connecting element is permanently connected to the insulating disconnecting element, the disconnecting element is moved at the same time into the intermediate space.

Depending on the configuration of the tripping slide and whether the tripping slide acts on the connecting element or on the disconnecting element, the conductive connecting element is pushed or pulled out of the intermediate space. According to one preferred version, there is at least one driving hook on the tripping slide which accommodates a section of the insulating disconnecting element. The insulating disconnecting element is then accommodated, preferably, on its lower edge by the driving hook so that the insulating disconnecting element, and thus, also the conductive connecting element, are moved up when the tripping slide moves out of the first position into the second position so that the connecting element is pushed out of the intermediate space and the insulating disconnecting element is pushed into the intermediate space.

In the overvoltage protection element, in accordance with the invention, the connecting element is thus the sole current-carrying element which is arranged to be able to move. The metallic terminal element is, conversely, like the terminal contact, made rigid so that the two elements are correspondingly durable and can be made with a correspondingly large cross section in order to be able to reliably transmit large impulse currents as well. Because there is no movable line supply, very high surge current and short circuit current carrying capacity can be ensured.

The overvoltage protection element in accordance with the invention is advantageously made as a “protective plug” so that, together with the corresponding bottom part of the device, it forms an overvoltage protection device. Advantageously, the bottom part of the device has a telecommunication contact for remote indication of the state of the overvoltage protection element. To activate a switch belonging to the telecommunications contact in the bottom part of the device, in the overvoltage protection element, there is a tripping pin which projects through an opening in the bottom of the housing. Preferably, the tripping pin is connected to the tripping slide so that the tripping pin is moved at the same time as moving of the tripping slide out of the first position into the second position, i.e., raised. For this purpose, there is a quiver-shaped bore in the tripping slide in which the tripping pin is located.

According to another preferred configuration, the tripping pin is used at the same time for attachment or guidance of two helical springs which form the spring system together with the tripping pin. The two helical springs are located on the tripping pin which in its middle region has a flange so that one helical spring on the one hand acts on the housing and on the other hand on the flange of the tripping pin and the other helical spring on the one hand acts on the flange and on the other on the tripping slide. With respect to the advantages of this spring system which has two helical springs, reference is made to German Patent DE 42 41 311 C2 and the spring system described there.

According to a last advantageous configuration of the overvoltage protection element in accordance with the invention, which is briefly described here, there is an optical state display which indicates whether the overvoltage limiting component located in the overvoltage protection element is still serviceable or not. For this purpose, on the tripping slide there is preferably a colored display surface, depending on the position of the tripping slide, the display surface or a certain region of the display surface being located underneath a viewing window made in the housing. The viewing window can be made preferably in the top of the housing so that the state display can also be easily read when the overvoltage protection device is locked on a mounting rail.

In particular, there are now a host of possibilities for embodying and developing the overvoltage protection element in accordance with the invention. Reference is made in this respect to the following description of preferred exemplary embodiments in conjunction with the accompanying drawings.

DETAILED DESCRIPTION OF THE INVENTION

Figure 1:
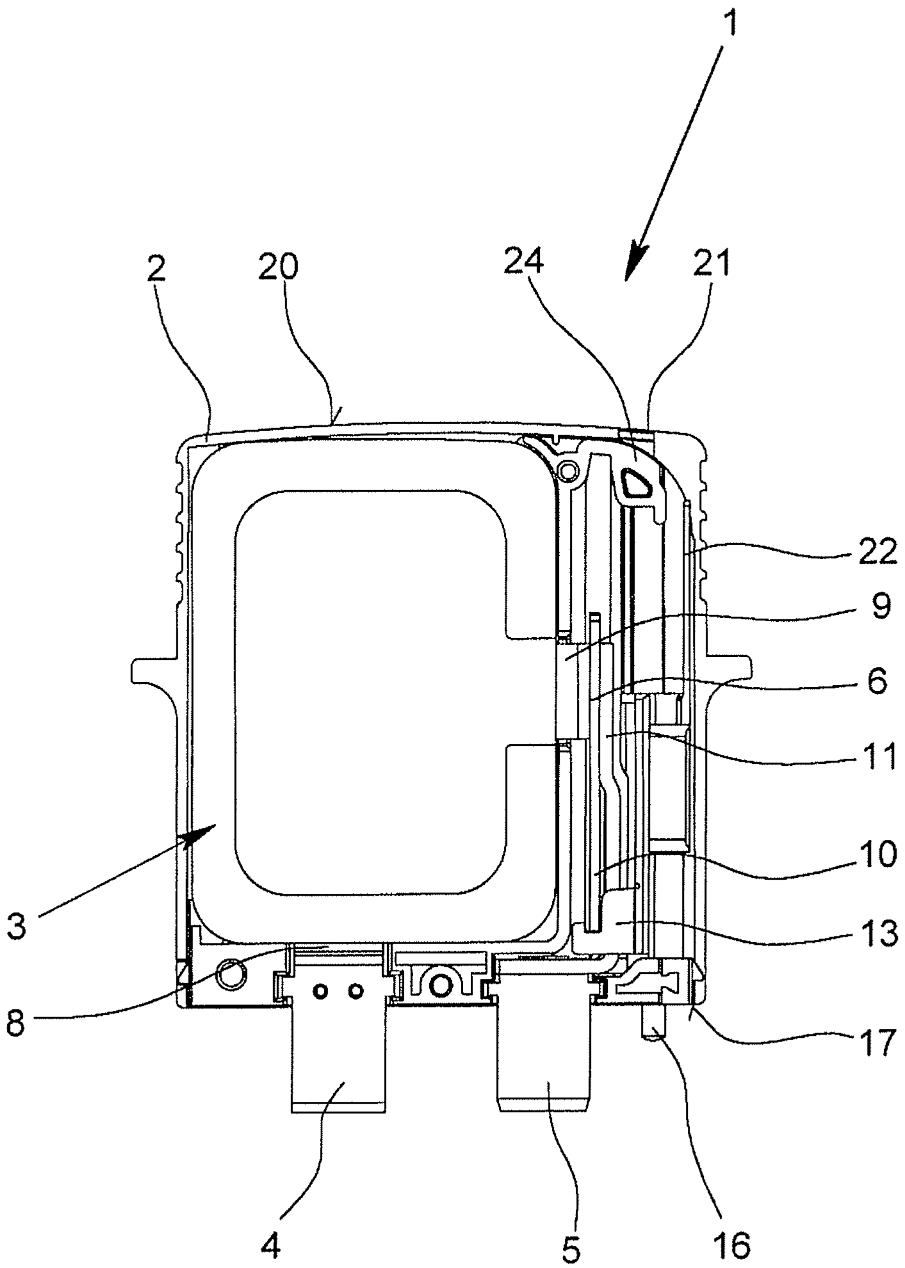
FIG. 1 shows a cross section of one exemplary embodiment of an overvoltage protection element.

The figures show an overvoltage protection element 1 with a housing 2, there being an overvoltage limiting component 3 in the housing 2. In the illustrated exemplary embodiments, the overvoltage limiting component is a varistor 3; alternatively, the overvoltage limiting component 3 can also be a double varistor or a gas-filled surge arrester, for example. The overvoltage protection element 1, which is made as a protective plug, has two terminal contacts 4, 5 which are made as knife-edge contacts and which can be plugged into the corresponding sockets of a device bottom part (not shown here).

Figure 2:
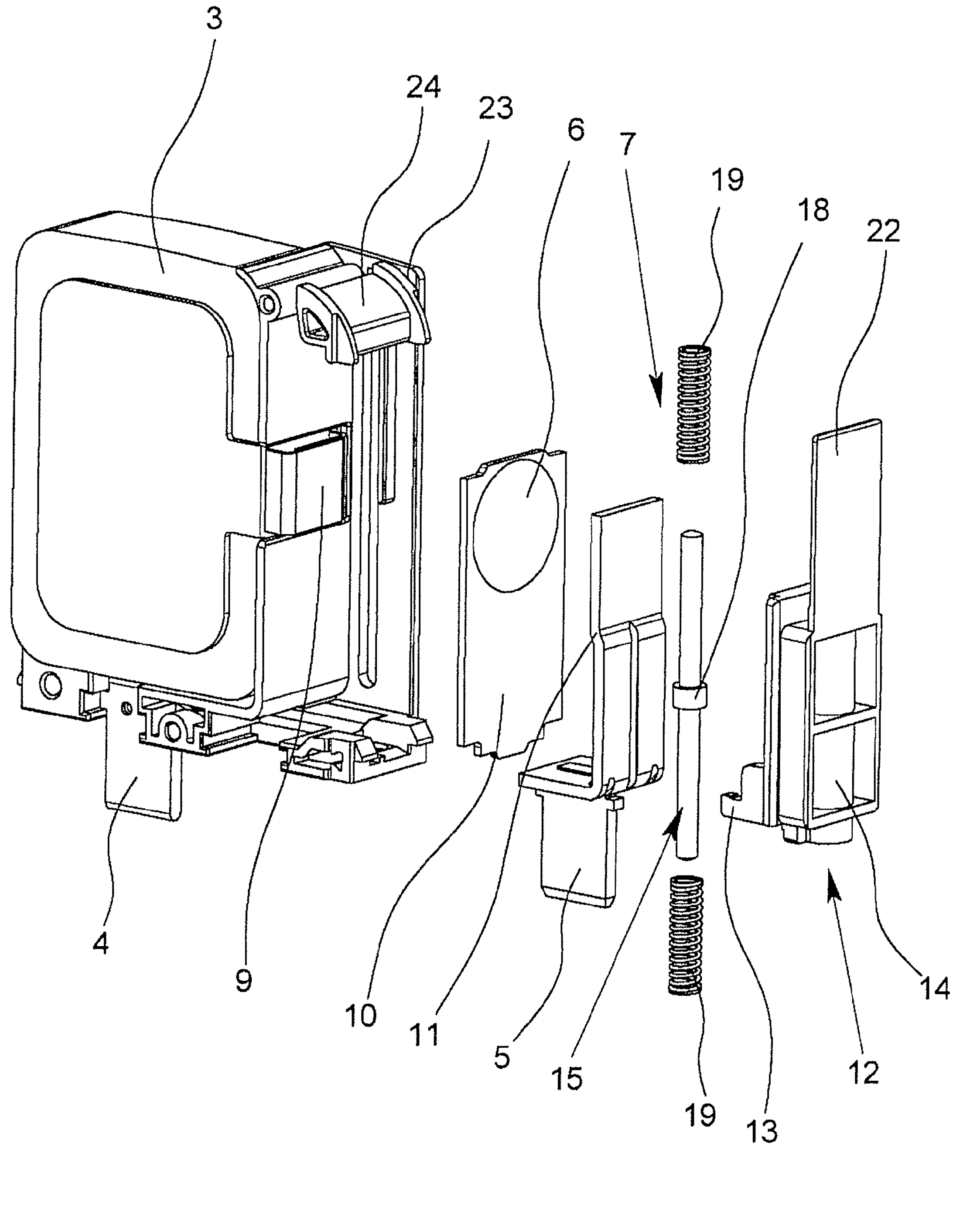
FIG. 2 is an exploded representation of the overvoltage protection element as shown in FIG. 1, without an external housing.

As is especially apparent from the exploded representation as shown in FIG. 2, the overvoltage protection element 1 also has a conductive connecting element 6 and a spring system 7. The two poles of the varistor 3 are each connected to a respective terminal lug 8, 9, in the normal state of the overvoltage protection element 1, the varistor 3 being connected to the two terminal contacts 4, 5 via the two terminal lugs 8, 9. The first terminal contact 4 is connected directly, preferably in one piece, to the terminal lug 8 of the first pole of the overvoltage limiting component 3.

In accordance with the invention, the electrically conductive connecting element 6 is permanently connected to the insulating disconnecting element 10, in the illustrated embodiment, the connecting element 6 being formed by a metal piece and the insulating disconnecting element 10 being formed by a rigid insulator plate which has an opening in which the metal piece is pressed. FIG. 2 also shows that the second terminal contact 5 is permanently connected to a rigid metallic terminal element 11 which is made here as a terminal angle. The rigid metallic terminal element 11 is dimensioned such that it can discharge impulse currents greater than 65 kA.

In the normal state of the overvoltage protection element, on the one hand, the connecting element 6 is soldered to the terminal lug 9 of the second pole of the varistor 3, and on the other hand, it is soldered to the end of the rigid terminal element 11 facing away from the second terminal contact 5 so that the second terminal contact 5, for existing solder connections, is connected to the second pole of the varistor 3 via the terminal element 11, the connecting element 6 and the terminal lug 9. Due to the heavy-duty design of these mechanical current-carrying parts, large impulse currents can also be reliably transmitted, and thus, discharged, as already stated.

If the solder connections between the connecting element 6 and the terminal lug 9 and between the connecting element 6 and the terminal element 11 melt as a result of a fault of the varistor 3, the connecting element 6 is pushed up out of the contact position by the force of the spring system 7, and at the same time, the insulating disconnecting element 10 is pushed into the intermediate space between the terminal lug 9 and the rigid terminal element 11. An arc which forms when the gap opens is thus extinguished directly by the insulating disconnecting element 10 which is moved into the gap, so that high insulation and tracking resistance and prompt extinguishing of the arc can be ensured without the distance between the terminal lug 9 of the second pole and the pertinent terminal contact 5 and the terminal element 11 having to be increased. The overvoltage protection element 1 can thus have relatively small dimensions so that it is especially suited as a plug part for the bottom part of the device locked onto the mounting rail. Since only the connecting element 6 is moved, not the terminal element 11, the terminal element 11 made as a terminal angle can be made correspondingly durable and with a relatively large cross section.

In particular, the exploded representation of FIG. 2 also illustrates that the overvoltage protection element 1 still has a tripping slide 12 which is produced preferably from plastic. The lower region of the tripping slide 12 has two driving hooks 13 which extend under the bottom of the disconnecting element 10. Moreover, a one-sided closed (blind) hole 14 is made in the tripping slide 12 into which the tripping pin 15 is inserted, whose lower end 16 projects out of an opening located in the bottom 17 of the housing 2 so that the tripping pin 15 can actuate the switch of a telecommunication contact located in the bottom part of the device (not shown here).

The middle region of the tripping pin 15 has a peripheral flange 18 against which a helical spring 19 plugged onto the tripping pin 15 rests. In the mounted state, the two helical springs 19 are tensioned. The lower helical spring 19 acts, on the one hand, on the housing 2, and on the other, on the lower face side of the flange 18, and the upper helical spring 19 acts, on the one hand, on the upper face side of the flange 18, and on the other, closed side of the bore 14 and which acts as a quiver in the tripping slide 12. The spring forces of the helical springs 19 act via the tripping slide 12 and its driving hooks 13 on the insulating disconnecting element 10, and thus, on the solder sites between the connecting element 6 and the terminal lug 9, on the one hand, and the connecting element 6 and the terminal element 11, on the other.

Figure 3:
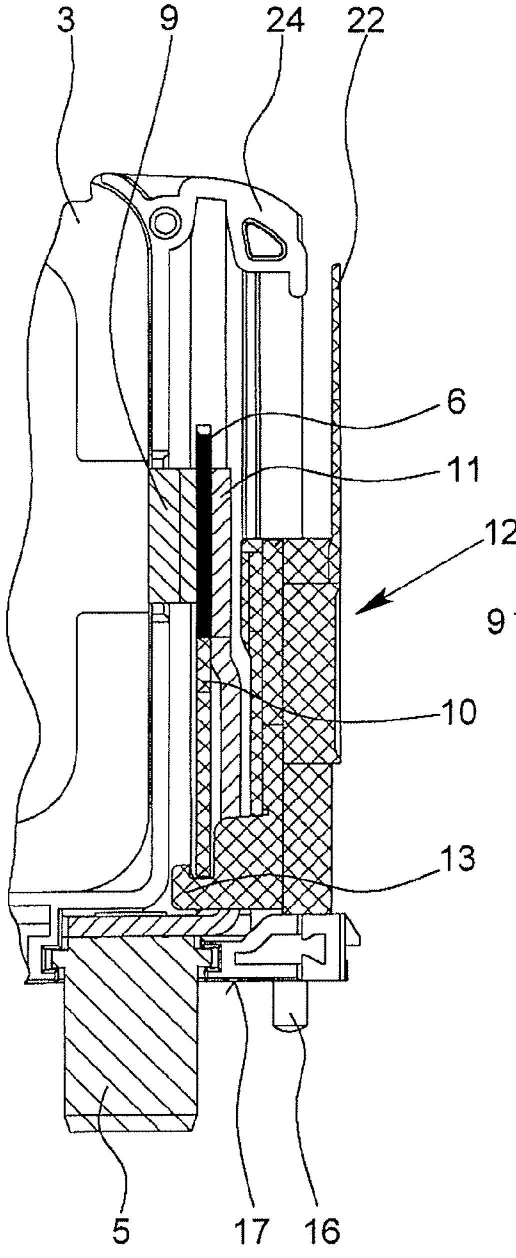
FIG. 3 is a cross-sectional view of part of the overvoltage protection element in the normal state, with the outer housing removed.
Figure 4:
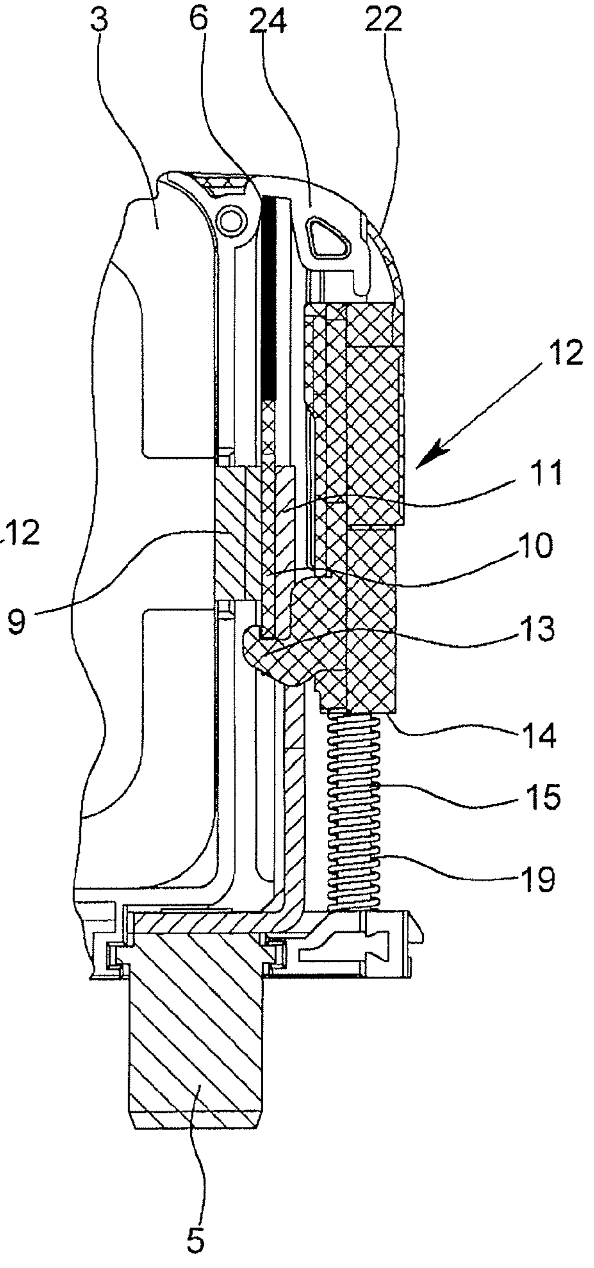
FIG. 4 is a cross-sectional view of part of the overvoltage protection element as shown in FIG. 3, with an electrically isolated varistor.

If over time a leak current flows continuously via the varistor 3 due to overloading or ageing, this leads to heating of the varistor 3; when the melting point of the solder is reached, this leads to separation of the solder connection since the solder sites can no longer apply the necessary counterforce to the spring force of the two helical springs 19. This can lead to the tripping slide 12 moving out of its first, lower position (FIG. 3) into its second, upper position (FIG. 4), the insulating plate being pushed up by the driving hooks 13 acting on the disconnecting element 10 so that the metal piece being used as the connecting element 6 is pushed out of the intermediate space between the terminal lug 9 and the connecting element 11 and the insulating disconnecting element 10 is pushed into the intermediate space. The disconnecting element 10 traveling into the intermediate space interrupts the electrical connection between the second pole of the varistor 3 and the second terminal contact 5 so that the varistor 3 is electrically isolated. At the same time, an arc which occurs is interrupted by the disconnecting element 10 which travels into the intermediate space and is thus extinguished.

To display the state of the varistor 3 and the overvoltage protection element 1, there is an optical state display which can be recognized through a viewing window 21 made in the top 20 of the housing 2. In the illustrated embodiment, the optical state display is formed by the tripping slide 12 having a flexible colored display surface 22 which in the second upper position of the tripping slide 12 covers a differently colored region 24 made on the inner housing 23 of the overvoltage protection element 1. The region 24 of the inner housing 23 which is located underneath the viewing window 21 is, for example, colored green so that this green region 24 is visible in the first, lower position of the tripping slide 12 (FIG. 3) though the viewing window 21 in the top 20 of the housing 2. In the case of a fault of the varistor 3 in which the solder connections are broken and the tripping slide 12 is moved into its second upper position, the flexible display surface 22 covers the colored region 24 of the inner housing so that, at this point, the display surface 22 of the tripping slide 12 is visible through the viewing window 21 in the housing 2. If, for example, this display surface 22 is colored red, it can be quickly and easily recognized through the viewing window 21 whether the varistor 3 is still serviceable (green state display) or defective, and therefore, has been electrically isolated (red state display).

As an alternative to the above described configuration of the optical state display, the display surface 22 can also be made with two colors—a green region and a red region, depending on the position of the tripping slide 12 one region of the display surface 22 being visible thorough the viewing window 21.

What is claimed is:

1. Overvoltage protection element, comprising:

a housing, at least one overvoltage limiting component which is located in the housing, two terminal contacts for electrical connection of the overvoltage protection element to a current or signal path to be protected, the first of the terminal contacts being directly in electrically conductive contact with the first pole of the overvoltage limiting component, an electrically conductive connecting element, a spring system which acts on the connecting element, and an insulating disconnecting element wherein, in a normal state of the overvoltage protection element, the connecting element is in electrically conductive contact both with a second of the terminal contacts and also with a second pole of the overvoltage limiting component via a thermally separating connection which is constructed to separate when the temperature of the overvoltage limiting component exceeds a given boundary temperature, and wherein the spring system is construct to exert a force which, with the thermally separating connection separated, causes the connecting element to move out of electrically conductive contact position such that the connecting element no longer is in electrically conductive contact with the second terminal contact and the second pole of the overvoltage limiting component, wherein the electrically conductive connecting element is permanently connected to the insulating disconnecting element such that, with the thermal connection separated, the conductive connecting element is moved by the force of the spring system out of the intermediate space between the second terminal contact and the second pole of the overvoltage limiting component and the insulating disconnecting element is moved into the intermediate space, so that the insulating disconnecting element is moved between the second terminal contact and the second pole of the overvoltage limiting component.

2. Overvoltage protection element in accordance with claim 1, wherein the electrically conductive connecting element is formed by at least one metal piece which is located in the insulating disconnecting element.

3. Overvoltage protection element in accordance with claim 1, wherein the insulating disconnecting element is formed by a rigid insulator plate.

4. Overvoltage protection element in accordance with claim 1, wherein a rigid metallic terminal element is permanently connected to the second terminal contact, in the normal state of the overvoltage protection element a respective thermally separating connection being formed between the connecting element and the metallic terminal element and between the connecting element and the second pole of the overvoltage protection element.

5. Overvoltage protection element in accordance with claim 1, further comprising a tripping slide movable mounted within the housing, the tripping slide being connected to the insulating disconnecting element and acted upon by the spring system such that, when the thermal connection is separated, the tripping slide is moved out of a first position into a second position by the force of the spring system, in the first position of the tripping slide, the electrically conductive connecting element being located between the second terminal contact and the second pole of the overvoltage limiting component, and in the second position of the tripping slide, the insulating disconnecting element being located between the second terminal contact and the second pole of the overvoltage limiting component.

6. Overvoltage protection element in accordance with claim 5, wherein at least one driving hook which accommodates a section of the insulating disconnecting element is located on the tripping slide.

7. Overvoltage protection element in accordance with claim 5, wherein a bore is formed in the tripping slide, wherein a tripping pin for actuating a telecommunications contact projects through the bore and wherein an opening is formed in a bottom wall of the housing through which the tripping pin extends when the thermal connection is broken.

8. Overvoltage protection element in accordance with claim 7, wherein the tripping pin has a flange and the spring system comprises two coil springs which are located on the tripping pin on opposite sides of the flange, one spring acting on the housing and on the flange of the tripping pin and the other spring acting on the flange and on the tripping slide.

9. Overvoltage protection element in accordance with claim 1, further comprising an optical state display member and a viewing window in the housing.

10. Overvoltage protection element in accordance with claim 9, wherein the optical state display member comprises a colored display surface on the tripping slide, and wherein, depending on the position of the tripping slide, at least part of the colored display surface being located underneath the viewing window.

11. Overvoltage protection element in accordance with claim 10, wherein the overvoltage limiting component is at least partially surrounded by an inner housing, the inner housing being colored in a region which is located underneath the viewing window, and wherein the colored display surface of the tripping slide is flexible and in the second position of the tripping slide covers the colored region of the inner housing being deflected thereover.

12. Overvoltage protection element in accordance with claim 1, wherein the overvoltage limiting component is a varistor.

* * * * *